United States Patent
Buergel

(10) Patent No.: US 9,523,029 B2
(45) Date of Patent: Dec. 20, 2016

(54) TWO-COMPONENT MORTAR COMPOSITION AND ITS USE

(75) Inventor: Thomas Buergel, Deutschland (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 13/988,220

(22) PCT Filed: Nov. 8, 2011

(86) PCT No.: PCT/EP2011/069613
§ 371 (c)(1),
(2), (4) Date: May 17, 2013

(87) PCT Pub. No.: WO2012/065878
PCT Pub. Date: May 24, 2012

(65) Prior Publication Data
US 2013/0237634 A1    Sep. 12, 2013

(30) Foreign Application Priority Data

Nov. 18, 2010 (DE) .................. 10 2010 051 818

(51) Int. Cl.
*C09K 8/00* (2006.01)
*E21B 43/16* (2006.01)
*C09K 8/467* (2006.01)
*C04B 26/06* (2006.01)
*C04B 26/16* (2006.01)
*C04B 28/04* (2006.01)
*C04B 28/06* (2006.01)
*F16B 13/14* (2006.01)
*C04B 111/00* (2006.01)

(52) U.S. Cl.
CPC ............ *C09K 8/467* (2013.01); *C04B 26/06* (2013.01); *C04B 26/16* (2013.01); *C04B 28/04* (2013.01); *C04B 28/06* (2013.01); *F16B 13/142* (2013.01); *C04B 2111/00715* (2013.01)

(58) Field of Classification Search
CPC ......... C09K 8/467; C04B 26/06; C04B 26/16; C04B 28/04; C04B 28/06; C04B 2111/00715; F16B 13/142
USPC ............ 523/130; 166/305.1, 381; 220/23.83
See application file for complete search history.

(56) References Cited

U.S. PATENT DOCUMENTS

| | | | |
|---|---|---|---|
| 5,854,305 A | 12/1998 | Schwiegk et al. |
| 2004/0072954 A1 | 4/2004 | Udding et al. |
| 2004/0092656 A1 | 5/2004 | Vogel et al. |
| 2009/0308533 A1 | 12/2009 | Gruen et al. |

FOREIGN PATENT DOCUMENTS

| | | |
|---|---|---|
| CN | 1481399 A | 3/2004 |
| CN | 1500129 A | 5/2004 |
| CN | 101484497 A | 7/2009 |
| DE | 101 15 591 A1 | 10/2002 |
| EP | 0 589 831 B1 | 10/1996 |
| EP | 0 761 792 A2 | 3/1997 |
| EP | 1 217 017 A1 | 6/2002 |
| EP | 2 032 622 B1 | 5/2010 |

OTHER PUBLICATIONS

International Preliminary Report on Patentability (PCT/IB/373), dated May 21, 2013, including Written Opinion (PCT/ISA/237) with English Translation (fifteen (15) pages).
International Search Report dated Jan. 1, 2012 with English translation (Three (3) pages).
Australian Office Action dated Jan. 16, 2015 (two (2) pages).
Chinese Office Action dated Oct. 11, 2014, with English translation (Fifteen (15) pages).
Russian-language Office Action dated Jul. 21, 2015 issued in counterpart Russian Application No. 2013127395 (three (3) pages).

*Primary Examiner* — David Karst
(74) *Attorney, Agent, or Firm* — Crowell & Moring LLP

(57) ABSTRACT

A description is given of a two-component mortar composition having a curable resin component having a content of at least one free-radically polymerizable resin, fillers, accelerators, stabilizers and optionally further conventional mortar constituents and a hardener component which is arranged separately therefrom to inhibit reaction and has a content of at least one peroxide for chemical fastening of anchoring means in boreholes, which is characterized in that the resin component contains from 0.1 to 0.5% by weight of at least one accelerator and from 0.003 to 0.03% by weight of at least one stabilizer and the hardener component contains from 0.1 to 0.35% by weight of organic peroxide, in each case based on the total weight of resin component and hardener component, and also the use of this two-component mortar composition for chemical fastening of anchoring means in boreholes.

19 Claims, No Drawings

TWO-COMPONENT MORTAR COMPOSITION AND ITS USE

This application is a national stage of PCT International Application No. PCT/EP2011/069613, filed Nov. 8, 2011, which claims priority under 35 U.S.C. §119 to German Patent Application No. 10 2010 051 818.2, filed Nov. 18, 2010, the entire disclosure of which is herein expressly incorporated by reference.

The subject matter of the present invention is a two-component mortar composition having a curable resin component having a content of at least one free-radically polymerizable resin, fillers, accelerators, stabilizers and optionally further conventional mortar constituents and a hardener component, which is arranged separately therefrom to inhibit reaction and has a content of at least one peroxide for chemical fastening of anchoring means in boreholes, as well as its use for chemical fastening of anchoring means in boreholes.

Two-component mortar compositions of this type are utilized, for example, as injection mortar for chemical anchoring of (preferably) metal elements in (preferably) mineral subsurfaces, such as in particular structures made of brickwork, concrete or natural stone.

The boreholes, which are required accordingly for fastening the anchoring means, are thereby initially introduced into the mineral subsurface, whereupon the curable resin component is mixed with the hardener component of the two-component mortar composition and is introduced into the borehole, whereupon the anchoring means, which is to be fastened, is inserted and adjusted, whereupon the mortar composition hardens. For this purpose, the applicant sells injection mortars in the form of quickly hardening systems having a hybrid system of a free-radically hardening methacrylate resin and hydraulically binding cement, which results in an exceptionally resilient plastic after the processing in the borehole.

To ensure a sufficient processing time, at least one stabilizer, which prevents a premature hardening of the mortar composition, is used in principle and in a distinct concentration in addition to the accelerator(s) and peroxide(s), which are necessary for the hardening.

The injection mortars of this type, which are known from the prior art, which have the typical stabilizer concentrations in the range of 0.2 to 0.6% by weight, based on the resin portion, require high concentrations of peroxide. From 7 to 15% by weight of peroxide, for example benzoyl peroxide, are hereby required as a function of the mixing ratio. In spite of this high quantity of peroxide, mixing fluctuations when deploying the masses occasionally result in a non-hardening in some places due to the peroxide portion, which is too low.

European patent EP 0 589 831 B1 thus discloses a two-component mortar for fastening anchoring means in boreholes, which contains from 1 to 6.5% by weight of peroxide and from 0.01 to 0.5% by weight of accelerator, wherein inhibitors or stabilizers are not mentioned. European patent EP 0 761 792 describes a plugging compound for the chemical fastening technology, which contains from 0.5 to 10% by weight of organic peroxide, based on the free-radically curable reaction resin, an accelerator for the hardener and from 0.0005 to 2% by weight of a piperidinyl-N-oxyl or tetrahydropyrrol-N-oxyl as . . . , if applicable in combination with a "conventional" inhibitor.

A two-component mortar composition having a curable resin component and a hardener component, which is arranged separately therefrom to inhibit reaction, for chemical fastening of anchoring means in boreholes, which contains from 0.5 to 10% by weight of peroxide, based on the free-radically polymerizable resin, an accelerator and a polymerization inhibitor is the subject matter of European patent application EP 1 619 174 A2.

Lastly, European patent EP 2 032 622 B1 discloses a quick-hardening chemical fastening system for anchoring elements having a free-radically curable reaction resin formulation of one or a plurality of hardening olefinic reaction resins, one or a plurality of aminic accelerators, one or a plurality of non-phenolic (anaerobic) inhibitors and lastly a hardener having at least one peroxide as initiator. The hardener thereby contains at least 1% of peroxide, based on the mass of the reaction resin formulation. The material contains at least 1.5% by weight of an aminic accelerator, from 0 to 20% by weight of a phenolic inhibitor and up to 5% by weight of a non-phenolic inhibitor in a ratio of accelerator to inhibitor of >5.

The inhibitors used in the prior art mortar compositions serve the purpose of adjusting the processing time to the desired time period.

These conventional two-component mortar compositions for chemical fastening of anchoring means in boreholes are now disadvantageous insofar as they must contain considerable quantities of peroxide of 0.5% by weight and higher, which is problematic, because peroxide-containing products starting at a peroxide concentration of 1% (dibenzoyl peroxide) must be labeled as being sensitizing.

The object of the present invention is now to specify a two-component mortar composition of the above-specified composition for chemical fastening of anchoring means, which has a lower peroxide concentration and is consequently exempt from having to be labeled and nonetheless provides for a good hardening and thus for the required load values with a broad mixing ratio in the range of 2:1 to 7:1, preferably of 3:1 to 5:1 and sufficient processing times.

This object is now attained in that the stabilizer or inhibitor, respectively, which until now has been necessary for adjusting the gel time, is dispensed with except for a minimum quantity necessary for the storage stability, and in that the processing time is controlled via the accelerator concentration.

The two-component mortar composition according to claim 1 is thus the subject matter of the invention. The dependent claims relate to preferred embodiments of the subject matter of this invention as well as to the use of this two-component mortar composition for chemical fastening of anchoring means in boreholes.

The invention thus relates to a two-component mortar composition having a curable resin component having a content of at least one free-radically polymerizable resin, fillers, accelerators, stabilizers and optionally further conventional mortar constituents, and a hardener component, which is arranged separately therefrom to inhibit reaction and has a content of at least one peroxide for chemical fastening of anchoring means in boreholes, which is characterized in that the resin component contains from 0.1 to 0.5% by weight of at least one accelerator and from 0.003 to 0.03% by weight of at least one stabilizer and the hardener component contains from 0.1 to 0.35% by weight of organic peroxide, in each case based on the total weight of resin component and hardener component.

The two-component mortar composition according to the invention makes it possible to adjust gel times of 3.5 to 7 minutes at 25° C., for example in the case of a peroxide content of 0.25% by weight, based on the total weight of resin component and hardener component, with a mixing ratio of resin component to hardener component of 3:1 parts by weight with a stabilizer content of 0.015% by varying the accelerator content of 0.35% by weight ±20%.

Surprisingly, it has been shown thereby that the cited gel times cannot be adjusted by means of the two-component mortars of the type under discussion with an acceleration concentration of greater than 0.5% by weight in the case of the specified peroxide concentration of 0.25% by weight with inhibitors, because the formulations of the increased inhibitor concentrations, which are necessary for this purpose, do not harden reliably anymore.

Surprisingly, however, the two-component mortar composition of the specified composition is not only able to avoid the labeling of the peroxide content, but also to obtain a mortar composition, which achieves good hardening and high load values with a broad range of the mixing ratio of resin component with hardener component in the range of 3:1 to 5:1 parts by weight with a sufficient processing time.

According to a preferred embodiment, the resin component contains from 8 to 25% by weight of free-radically polymerizable resin, from 8 to 25% by weight of reactive diluent, from 0.1 to 0.5% by weight of accelerator and from 0.003 to 0.03% by weight of stabilizer, from 40 to 70% by weight of filler and from 0.5 to 5% by weight of thickening agent and the hardener component contains from 0.1 to 0.35% by weight of peroxide, from 3 to 15% by weight of water, from 5 to 25% by weight of filler and from 0.1 to 3% by weight of thickening agent, in each case based on the total weight of resin component and hardener component.

The resin component preferably contains, as a free-radically polymerizable resin, resin components on the basis of unsaturated polyesters, vinyl esters, urethane(meth)acrylates and/or epoxy(meth)acrylates and allyic ethers, optionally in a mixture with reactive diluents, which contain ethylenically unsaturated structural elements.

According to a preferred embodiment, the resin component contains at least a tertiary N,N-substituted aniline, tertiary N,N-substituted toluidine and/or an alkoxylated derivative thereof, such as, for example, N,N-dimethyl aniline, N,N-diethyl aniline, N-ethyl-N-(hydroxyethyl)-aniline, N,N-dimethyl-p-toluidine, N-methyl-N-(hydroxyethyl)-p-toluidine, N,N-diisopropyliden-p-toluidine, di(hydroxyethyl)-p-toluidine, di(hydroxyethyl)-m-toluidine and/or ethyoxylated di(hydroxyethyl)-p-toluidine as accelerator.

According to a further preferred embodiment, the resin component additionally contains a phenolic and/or non-phenolic stabilizer. The phenolic stabilizer is preferably chosen from the group comprising hydrochinon, 2-methyl hydrochinon, methoxyphenol, 2,4,6-trimethylphenol, pyrocatechol, 3-methoxypyrocatechol, 4-tert-butylpyrocatechol, 3,5-di-tert.-butylpyrocatechol, butylhydroxytoluene and derivatives thereof.

The resin component can contain an N-oxyl compound and/or a heterocyclic stabilizer as the non-phenolic stabilizer, wherein piperidinyl-N-oxyl derivatives and tetrahydropyrrol-N-oxyl derivatives are preferred as N-oxyl compounds, while phenothiazine is used as a preferred heterocyclic stabilizer. The preferred piperidin-N-oxyl derivative is 4-hydroxy-2,2,6,6-tetramethyl-piperidin-N-oxyl.

To further improve the adhesion of the mortar composition on the subsurface and the anchoring means, the resin component contains at least one ethylenically unsaturated compound, such as, for example, styrene, alpha-methylstyrene, divinyl benzene, (meth)acrylamide, methyl(meth)acrylate, ethyl(meth)acrylate, propyl(meth)acrylate, butyl(meth) acrylate, ethylhexyl(meth)acrylate, neopentylglycol(meth) acrylate, ethylene glycoldi(meth)acrylate, diethylene glycoldi(meth)acrylate, polyethylene glycol(meth)acrylate, propylene glycoldi(meth)acrylate, butandioldi(meth)acrylate, glycerin(meth)acrylate, hydroxyethyl(meth)acrylate, acetoacetatoethyl(meth)acrylate, alcoxylated bisphenol-A-di(meth)acrylate and/or glycidylmethacrylate as reactive diluent.

The nomenclature " . . . (meth)acryl . . . " used herein means that "methacryl . . . ," "acryl . . . ," " . . . methacryl . . . " as well as " . . . acryl . . . " compounds are supposed to be included with this designation.

The hardener component of the two-component mortar composition according to the invention preferably contains an organic peroxide, such as dibenzoyl peroxide, methyl ethyl ketone peroxide, tert-butylperbenzoate, cyclohexanonperoxide, lauryl peroxide, cumolhydroperoxide and/or tert-butylperoxy-2-ethyl hexanoate as peroxide.

Lastly, the resin component and/or the hardener component can contain fillers, as are common for the mortar compositions under discussion, in particular for injection mortars, such as quartz, sand, fumed silica, corundum, chalk, talc, ceramic, aluminum oxide, glass, cement, light spar and/or heavy spar in a suitable particle size distribution. Portland cement, aluminate cement and/or gypsum can thereby preferably be used in the resin component when using cement as filler,
because the peroxide, which is normally contained in the hardener component, contains water as phlegmatizing agent, which is used for setting the cement portion in the resin component.

Furthermore, the resin component and/or the hardener component can optionally contain fumed silica, layered silicate, acrylate or polyurethane thickeners, castor oil derivatives, Neuburg siliceous earth and/or xanthan gum as thickening agent, so as to provide the material with the required viscosity.

Furthermore, to adjust the viscosity of the hardener component, it is possible to add thereto 0 to 5% by weight of at least one organic solvent, such as glycol, glycerin, and/or a water-soluble polyethylene glycol derivative and/or polypropylene glycol derivative, which can be copolymerized with the free-radically polymerizable resin.

The resin component according to the invention and the hardener component according to the invention are preferably present separately in different containers to inhibit reaction, preferably in a multi-chamber device, such as a multi-chamber cartridge and/or multi-chamber cylinder or in two-component capsules. After being produced separately, the hardener component and the resin component are thereby introduced into these separate containers, from which they are ejected by means of mechanical devices or a propellant and are guided through a mixing device, preferably a static mixer. The hardening mortar composition exiting from the static mixer is inserted directly into the borehole in the solid subsurface during the chemical fastening of anchoring means, whereupon the construction element to be fastened, for example an anchor rod, is inserted. Excellent strength values for the anchoring means fastened in the borehole are achieved with a gel time of the two-component mortar composition according to the invention in the range of 3.5 to 7 minutes. It has been shown that by using the quantities of accelerator, stabilizer and peroxide which are chosen according to the invention it is not only possible to avoid labeling the two-component mortar composition as being "irritating and sensitizing," but that it is readily possible to adjust the gel time suitable for the application of the mortar composition via the acceleration concentration, wherein high load values of the hardened mortar composition are achieved at the same time.

The following examples and the comparative example serve to further elucidate the invention.

EXAMPLES 1 TO 3 AND COMPARATIVE EXAMPLE

The hardener components A of the comparative example and of examples 1 to 3 are initially produced by mixing the constituents specified in Table I below. The hardener components B for the comparative example and for examples 1 to 3 are produced correspondingly. For this purpose, the components are initially premixed by hand in a 1 liter plastic beaker and are subsequently mixed for 10 minutes in the dissolver (4500 min$^{-1}$; <100 mbar),

TABLE I

|  | Comparison | Example 1 | Example 2 | Example 3 |
|---|---|---|---|---|
| Resin component A | | | | |
| Vinyl ester resin |  |  | 15 | 16.7 |
| Urethane methacrylate resin | 12.7 | 12.7 |  |  |
| 1.4-butandioldi-methacrylate | 13.43 | 14.07 |  |  |
| Diethylene glycol Dimethacrylate |  |  | 12.015 | 15.5 |
| Hydroxyethyl-methacrylate | 3 | 3 |  |  |
| Acetoacetatoe-thylmethacrylate |  |  | 2 |  |
| Di(hydroxyxethyl)-p-toluidine |  |  | 0.26 | 0.33 |
| Ethoxylated di (hydroxyethyl)-p-toluidine | 0.9 | 0.3 |  |  |
| 4-hydroxy-tempo |  |  | 0.005 |  |
| Butylhydroxytoluene (BHT) | 0.07 | 0.03 |  |  |
| Tert.-butylpyrocatechol |  |  | 0.2 | 0.023 |
| Fumed silica | 1.9 | 1.9 |  |  |
| Polyamide thickener |  |  | 1.4 |  |
| Quartz 0-0.7 mm | 28 | 28 | 24.3 |  |
| Glass spheres 0.2-0.6 mm |  |  |  | 26.58 |
| Alumina cement |  |  | 20 | 22.2 |
| Portland cement | 15 | 15 |  |  |
| Total | 75 | 75 | 75 | 83.333 |
| hardener component B | | | | |
| Dibenzoylperoxide | 0.25 | 0.25 | 0.25 | 0.3 |
| Water | 7 | 7 | 5.75 | 3.84 |
| Dipropylene glycol |  |  | 1.25 | 0.8 |
| Fumed silica | 1 | 1 | 0.5 | 0.33 |
| Layered silicate |  |  | 0.12 | 0.1 |
| Quartz 0-80 μm | 15.75 | 15.75 | 15.88 | 10.5 |
| Aluminum oxide | 1 | 1 |  |  |
| Heavy spar |  |  | 1.25 | 0.8 |
| Total | 25 | 25 | 25 | 16.67 |

After being produced separately, the resin components A or the hardener components B, respectively, are mixed in a static mixer in a volume ratio of 3:1 or 5:1, respectively, as specified in Table II below, and are introduced into a prepared borehole in concrete having a diameter of 14 mm. The gel time of the examples is in the range of 5 to 6 minutes at 25° C.

An M12 anchor rod having an anchoring depth of 72 mm is then introduced into the borehole and the extraction force of the anchor rod is determined after a hardening time of 1 day at room temperature (25° C.), wherein a hydraulic tool is used which is able to measure the extraction force of the anchor rod. The extraction force measured here at 25° C. and the standard deviation are specified in Table II below.

TABLE II

|  | Comparison | Example 1 | Example 2 | Example 3 |
|---|---|---|---|---|
| Mixing ratio A:B | 3:1 | 3:1 | 3:1 | 5:1 |
| Peroxide content | 0.25 | 0.25 | 0.25 | 0.3 |
| Accelerator content | 0.9 | 0.3 | 0.26 | 0.33 |
| Stabilizer content | 0.07 | 0.03 | 0.025 | 0.023 |
| Gelling time at 25° C. | 6:15 min | 6:00 min | 5:00 min | 5:20 min |
| Failure load [kN]* at 25° C. | 14.4 | 35.5 | 53.9 | 68.5 |
| Standard deviation | 7 | 1.8 | 5.5 | 1.7 |

The above table shows that the two-component mortar composition according to the invention results in considerably improved failure loads at 25° C. than that achieved with the material of the comparative example, which differs from the teaching according to the invention with respect to the content of accelerator, stabilizer and peroxide.

The invention claimed is:

1. A two-component mortar composition comprising a curable resin component and a hardener component;
   wherein the resin component and the hardener component are unmixed with each other;
   wherein the resin component contains from 8 to 25% by weight of at least one free-radically polymerizable resin, from 8 to 25% by weight of at least one reactive diluent, from 0.1 to 0.5% by weight of at least one accelerator, from 0.003 to 0.03% by weight of at least one stabilizer, from 40 to 70% by weight of at least one filler, and from 0.5 to 5% by weight of at least one thickening agent; and
   wherein the hardener component contains from 0.1 to 0.35% by weight of at least one peroxide, from 3 to 15% by weight water, from 5 to 25% by weight of at least one filler, and from 0.1 to 3% by weight of at least one thickening agent,
   in each case based on the total weight of resin component and hardener component;
   wherein the ratio of the resin component to the hardener component is in a range of 2:1 to 7:1 parts by weight.

2. The two-component mortar composition according to claim 1, wherein the at least one free-radically polymerizable resin is selected from the group consisting of an unsaturated polyester, a vinyl ester, a urethane(meth)acrylate and an epoxy(meth)acrylate.

3. The two-component mortar composition according to claim 1, wherein the at least one accelerator is selected from the group consisting of a tertiary N,N-substituted aniline, a tertiary N,N-substituted toluidine and an alkoxylated derivative thereof.

4. The two-component mortar composition according to claim 3, wherein the resin component contains N,N-dimethyl aniline, N,N-diethyl aniline, N-ethyl-N-(hydroxyethyl)-aniline, N,N-dimethyl-p-toluidine, N-methyl-N-(hydroxyethyl)-p-toluidine, N,N-diisopropyliden-p-toluidine, di(hydroxyethyl)-p-toluidine, di(hydroxyethyl)-m-toluidine and/or ethyoxylated di(hydroxyethyl)-p-toluidine as the tertiary N,N-substituted aniline or the tertiary N,N-substituted toluidine, respectively.

5. The two-component mortar composition according to claim 1, wherein the at least one stabilizer is selected from the group consisting of a phenolic stabilizer and a non-phenolic stabilizer.

6. The two-component mortar composition according to claim 5, wherein the phenolic stabilizer is at least one selected from the group consisting of hydrochinon, 2-methyl hydrochinon, methoxyphenol, 2,4,6-trimethylphenol, pyrocatechol, 3-methoxypyrocatechol, 3,5-di-tert.-butylpyrocatechol, butylhydroxytoluene and derivatives thereof.

7. The two-component mortar composition according to claim 5, wherein the non-phenolic stabilizer is at least one selected from the group consisting of an N-oxyl compound and a heterocyclic stabilizer.

8. The two-component mortar composition according to claim 7, wherein the non-phenolic stabilizer is at least one selected from the group consisting of an N-oxyl compound and a heterocyclic stabilizer;
wherein the N-oxyl compound is selected from the group consisting of a piperidinyl-N-oxyl and a tetrahydropyrrol-N-oxyl derivative; and
wherein the heterocyclic stabilizer is phenothiazine.

9. The two-component mortar composition according to claim 8, wherein the piperidin-N-oxyl is 4-hydroxy-2,2,6,6-tetramethyl-piperidin-N-oxyl.

10. The two-component mortar composition according to claim 1, wherein the reactive diluent is at least one ethylenically unsaturated compound.

11. The two-component mortar composition according to claim 10, wherein the at least one reactive diluent is selected from the group consisting of styrene, alpha-methylstyrene, divinyl benzene, (meth)acrylamide, methyl(meth)acrylate, ethyl(meth)acrylate, propyl(meth)acrylate, butyl(meth)acrylate, ethylhexyl(meth)acrylate, neopentylglycol(meth)acrylate, ethylene glycoldi(meth)acrylate, diethylene glycoldi(meth)acrylate, polyethylene glycol(meth)acrylate, propylene glycoldi(meth)acrylate, butandioldi(meth)acrylate, glycerin(meth)acrylate, hydroxyethyl(meth)acrylate, acetoacetatoethyl(meth)acrylate, alcoxylated bisphenol-A-di(meth)acrylate and glycidylmethacrylate.

12. The two-component mortar composition according to claim 1, wherein the at least one peroxide is an organic peroxide.

13. The two-component mortar composition according to claim 12, wherein the organic peroxide is selected from the group consisting of dibenzoyl peroxide, methyl ethyl ketone peroxide, tert.-butylperbenzoate, cyclohexanonperoxide, lauryl peroxide, cumolhydroperoxide and tert.-butylperoxy-2-ethyl hexanoate.

14. The two-component mortar composition according to claim 1, wherein the at least one filler in the resin component and/or the at least one filler in the hardener component are selected from the group consisting of quartz, sand, fumed silica, corundum, chalk, talc, ceramic, aluminum oxide, glass, cement, light spar and heavy spar.

15. The two-component mortar composition according to claim 1, wherein the at least one thickening agent in the resin component and/or the at least one thickening agent in the hardener component are selected from the group consisting of fumed silica, layered silicate, acrylate or polyurethane thickeners, castor oil derivatives, Neuburg siliceous earth and xanthan gum.

16. The two-component mortar composition according to claim 1, wherein the hardener component contains from 0 to 5% by weight of at least one organic solvent.

17. The two-component mortar composition according to claim 16, wherein the at least one organic solvent, which can be copolymerized with the free-radically polymerizable resin, is selected from the group consisting of a glycol, glycerin, a water-soluble polyethylene glycol derivative and a polypropylene glycol derivative.

18. A method for chemical fastening of anchoring means in boreholes, comprising the steps of:
a) separately producing the resin component and the hardener component of the two-component mortar composition according to claim 1,
b) mixing the resin component and the hardener component in a static mixer,
c) introducing the mixture resulting from step b) into a prepared borehole, and
d) introducing an anchoring means into the borehole.

19. A two-component mortar composition container,
wherein the container is selected from the group consisting of a multi-chamber device or capsules;
wherein the multi-chamber device comprises at least two chambers,
wherein one chamber comprises the resin component according to claim 1 and another chamber comprises the hardener component according to claim 1, and
wherein the multi-chamber device is selected from the group consisting of a multi-chamber cartridge and a multi-chamber cylinder; and
wherein the capsules comprises at least two capsules,
wherein one capsule comprises the resin component according to claim 1 and another capsule comprises the hardener component according to claim 1.

* * * * *